United States Patent

Seo et al.

[11] Patent Number: 5,943,180
[45] Date of Patent: Aug. 24, 1999

[54] INFORMATION RECORDING MEDIUM AND RECORDING/REPRODUCING METHOD FOR UTILIZING THE SAME

[75] Inventors: Yuzo Seo; Hiroyuki Ikeda, both of Yokohama, Japan

[73] Assignee: Mitsubishi Chemical Company, Tokyo, Japan

[21] Appl. No.: 08/773,131

[22] Filed: Dec. 26, 1996

[30] Foreign Application Priority Data

Dec. 26, 1995 [JP] Japan ................................. 7-338906
Aug. 9, 1996 [JP] Japan ................................. 8-211375

[51] Int. Cl.⁶ .................................................. G11B 5/584
[52] U.S. Cl. .................................. 360/77.12; 360/77.01
[58] Field of Search ................................ 360/77.12, 53, 360/48, 78.02, 70, 77.08, 75, 77.01

[56] References Cited

U.S. PATENT DOCUMENTS

| | | | |
|---|---|---|---|
| 4,472,750 | 9/1984 | Klumpp et al. | 360/78.02 |
| 4,586,094 | 4/1986 | Chambors et al. | 360/77.08 |
| 5,432,652 | 7/1995 | Comeaux et al. | 360/77.12 |
| 5,453,887 | 9/1995 | Negishi et al. | 360/77.12 |

*Primary Examiner*—Nabil Hindi
*Assistant Examiner*—James L Habermehl
*Attorney, Agent, or Firm*—Oblon, Spivak, McClelland, Maier & Neustadt, P.C.

[57] ABSTRACT

An information recording medium and method arranges a plurality of information recording tracks in parallel to a running direction of an information recording medium and divides the tracks into a plurality of data blocks, and a servo-burst section between the data blocks. The servo-burst section has, alternately servo-burst-signal recording sections and servo-burst-signal non-recording section. The position of a recording/reproducing head is controlled by using a plurality of recording/reproducing head gaps provided in the head and detecting positional deviations of the head gaps from the centers of the information recording tracks. The deviations are detected from intensity changes of signals from the servo-burst-signal recording sections. The head position control is performed such that at least one of the two head gaps is located at a position to reproduce a signal from both of the servo-burst-signal recording section and the servo-burst-signal non-recording section simultaneously The placement of the servo-burst-signal recording/non-recording sections with respect to head gaps results in a ratio of the signals of the head gap located corresponding to the servo-burst-signal recording section with respect to the signal of the head gap located corresponding to the servo-burst-signal non-recording section as being a predetermined ratio.

16 Claims, 8 Drawing Sheets

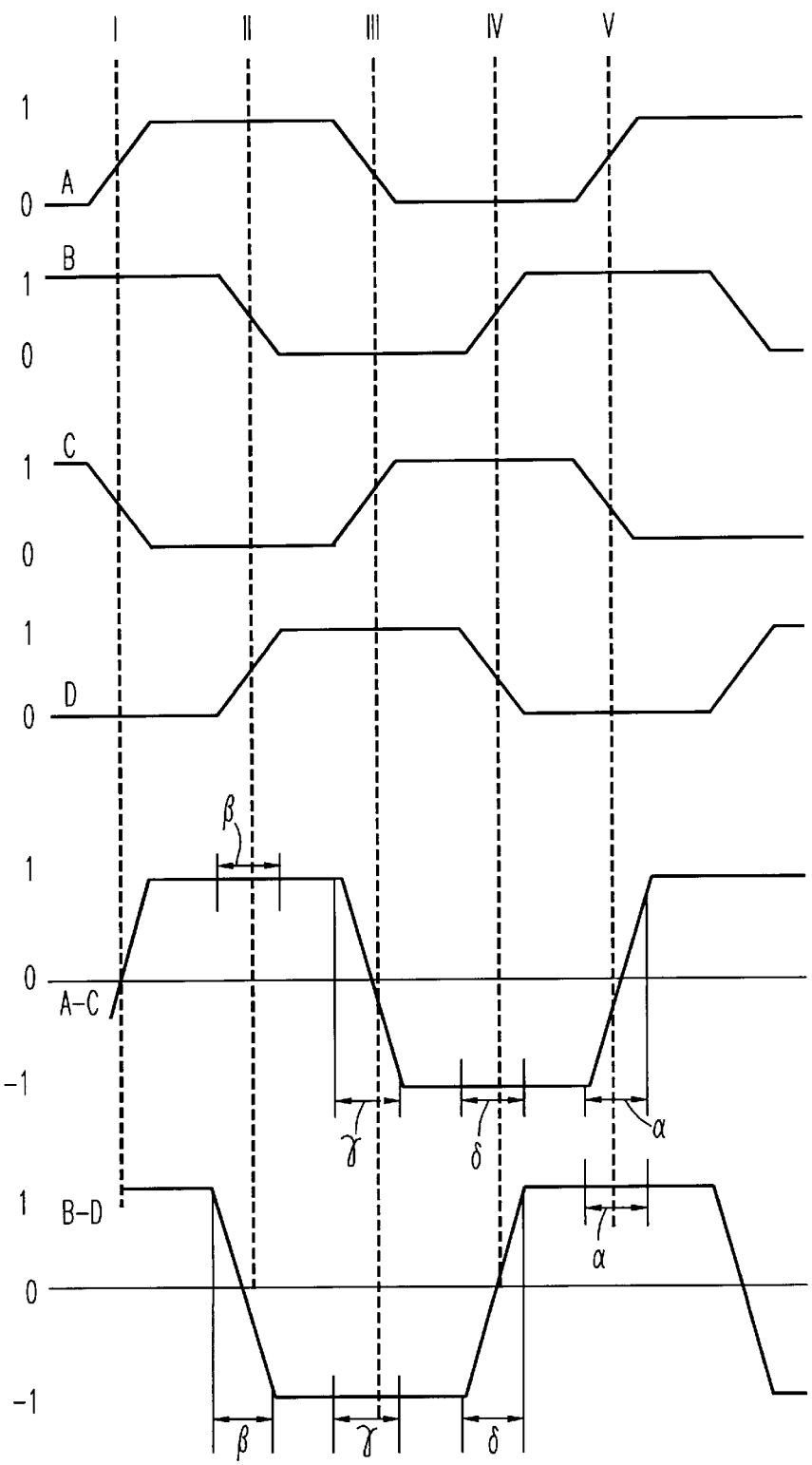

FIG. 6A   A 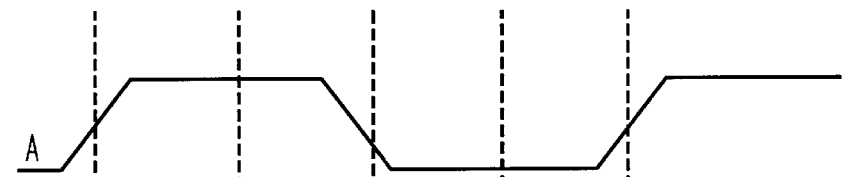
FIG. 6B   B 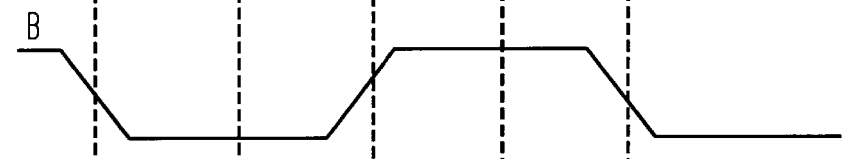
FIG. 6C   D 
FIG. 6D   A−B 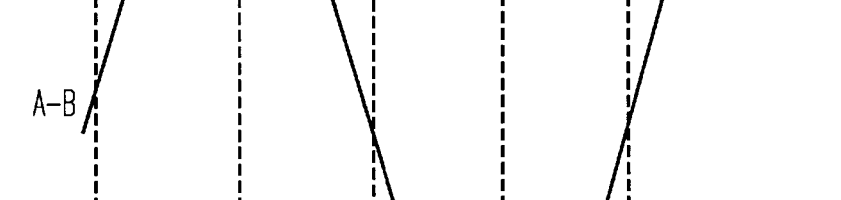
FIG. 6E   (A+B)−2D 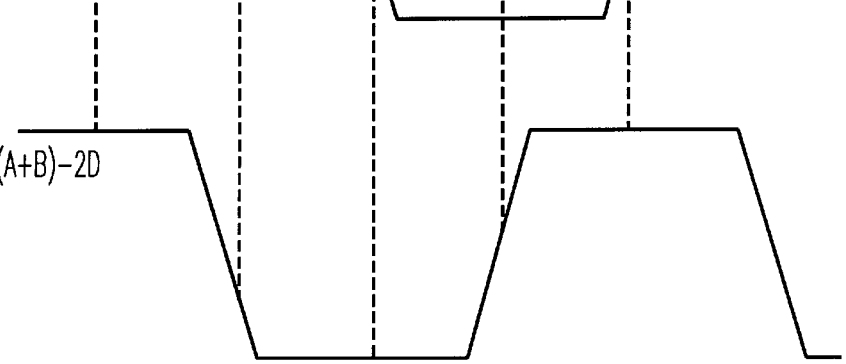

INFORMATION RECORDING MEDIUM AND RECORDING/REPRODUCING METHOD FOR UTILIZING THE SAME

BACKGROUND OF THE INVENTION

1. Field of the Invention

This invention relates to an information recording medium and information recording/reproducing method and, more particularly, to an information recording medium and information recording/reproducing method which reduces a track pitch between information recording tracks in a recording medium, and increases the information recording density, and further enables information such as a servo-burst signal for tracking control to be easily recorded.

2. Description of Related Art

In a computer system a backup operation, i.e., copying of stored information into another recording medium, is performed periodically, so as to avoid losing information due to an accident in a storage device such as a hard disk or natural "computer disasters". As a backup recording medium or an intermediate medium to transport the information to another computer, an information recording medium such as a magnetic tape is widely used.

One known representative recording device used for this purpose is a tape streamer. The tape streamer includes, for example, a ¼ inch magnetic tape cartridge having a number of information recording tracks provided in parallel to a tape-running direction A magnetic head provided opposing to the recording medium is moved in a direction orthogonal to the tape-running direction, so as to be positioned above a predetermined track and then performs the recording/reproducing information operation.

Recently, with an increase of information amount and downsizing of information recording media, the present inventors identified that there is an increasing need for improvement in recording line density and track density in tape streamers. However, the conventional streamer moves the magnetic head by open-loop control using a stepping motor, and lacks a function for correcting errors due to meandering of a tape and the like. For this reason, the reduction of track pitch for increasing the track density is limited.

To solve this problem, a servo system has been proposed. This control system records a tracking-control signal (servo signal) on a recording medium and causes a recording/reproducing head to follow the center of each track by using the signal. More specifically, as a servo method, the position of a recording/reproducing head is controlled by reading a pattern of a servo signal recorded in the central portion of an information recording medium and detecting tracking errors (i.e., positional shifts).

FIG. 7 shows an example of the conventional information recording medium used in the servo method. This example uses a head having a plurality of recording/reproducing gaps 114. A dedicated track 111 for servo signals, comprising servo-burst-signal recording sections 112 and servo-burst-signal non-recording sections 113, is provided on the medium. During reproduction of data on the dedicated track 111 by one of the plurality of gaps 114, if the head position is controlled such that a ratio between a signal intensity in a portion including the non-recording section 113 and that in a portion not including the non-recording section becomes 1:2, the position of a data reproduction gap is at the center of the track.

FIG. 8 is another example of a conventional information recording medium used in another servo method. In this example, information recording tracks 221 and servo-burst tracks 222 are alternatively arranged. Each servo-burst track 222 includes an optical servo-burst-signal recording section 223 and a servo-burst-signal non-recording section 224. The signal recording section 223 is irradiated with a beam, and an optical head 226 detects a reflectance of the signal recording section 223. The position of an information recording/reproducing head 225, located with a predetermined interval from the optical head 226, is controlled by controlling the position of the optical head 226 such that the detected reflectance is within a predetermined range.

FIG. 9 is another example of a conventional information recording medium used in the so-called sample-hold servo method. In this servo method, information recording tracks 331 are divided into a plurality of blocks, and a servo-burst section 332 is provided between the blocks. The servo-burst section 332 includes a plurality of pairs of servo ID sections 335 and servo-burst-signal recording sections 333, arrayed in parallel. In each array of the servo-burst section 332, the interval between the servo ID section 335 and the respective servo-burst-signal recording section 333 is staggered so as to be different from a neighboring recording section in an adjacent array. A center of each array of the servo-burst section 332 is shifted from the center of a data track in a widthwise direction of the servo-burst section 332 so that a head 334 performs reproduction of information from normally two servo-burst-signal recording sections 333. The positional deviation of the head 334 is detected by the difference between outputs from the two servo-burst-signal recording sections 333 reproduced by the head 334; thus, the head position is controlled.

However, in the servo methods applied to the conventional information recording media as shown in FIGS. 7 and 8, as dedicated servo tracks for tracking are provided continuously in a running direction of the recording-medium and in parallel to data tracks, increasing information recording capacity is limited because of the space occupied by the dedicated servo tracks. Further, in the method as shown in FIG. 9, as the positional deviation of the head 334 is detected from the output difference of servo signals reproduced from two adjacent servo-burst-signal recording sections 333, and the head position is controlled using the deviation, a plurality of servo-burst-signal recording sections are required. Accordingly increasing information recording capacity is also limited. Further, according to this method, because the servo-burst-signal recording section 333 must be provided with respect to each information recording track, time is consumed to write these signals. Additionally, the cost for implementing this method is higher than desired.

SUMMARY OF THE INVENTION

Accordingly, one object of this invention is to provide a novel information recording medium and information recording/reproducing method that overcomes the above-mentioned limitations of existing methods and systems.

Another object of the present invention is to provide a novel information recording medium and information recording/reproducing method which reduces a servo-burst section and enables a servo-burst signal to be written easily.

According to the present invention, the foregoing objects are attained by providing an information recording medium having a plurality of information recording tracks, arranged in parallel to a running direction of the information recording medium, and divided into a plurality of data blocks, for recording/reproducing information, and a servo-burst section between the data blocks, wherein the servo-burst section includes, alternatively, a servo-burst-signal recording section and a servo-burst-signal non-recording section, respectively having a length in a direction approximately orthogonal to the running direction that is at least twice an interval between centers of the information recording tracks.

Further, the foregoing objects are attained by providing an information recording medium having the above construction, wherein the information recording medium is a longitudinal information recording medium.

Further, the foregoing objects are attained by providing an information recording/reproducing method for the information recording medium using a head having at least two recording/reproducing head gaps including steps of detecting deviations of positions of the head gaps from the centers of the information recording tracks, using intensity changes of reproduction signals obtained from signals from the servo-burst section, and controlling the positions of the head gaps based on the deviations such that at least one of the two head gaps is located at a position to reproduce a signal from both of the servo-burst-signal recording section and the servo-burst-signal non-recording section simultaneously, wherein a ratio of the signals of the head gap located corresponding to the servo-burst-signal recording section with respect to the signal of the head gap located corresponding to the servo-burst-signal non-recording section is a predetermined ratio.

Note that the term "recording/reproducing" used herein generally includes "recording or reproducing" as well as "recording and reproducing". The "recording/reproducing head" includes a head for both recording and reproduction, and a head only for reproduction.

The information recording medium and recording/reproducing method of the present invention easily provides a large-capacity information recording medium and enables exact track-positioning. Further, in a servo method according to the recording/reproducing method of the present invention, it is not necessary to arrange the servo-burst-signal recording sections at positions shifted in the recording-medium movement direction Consequently, this method attains an extremely low ratio of the servo-burst section with respect to the data track section, which in turn obtains a very large capacity for recording data on an information recording surface of the information recording medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A to 3F are waveform charts showing the servo-signal reproduction intensities in respective head gaps as applied to the information recording medium of FIG. 1;

FIGS. 6A to 6E are waveform charts showing the servo-signal reproduction intensities in respective head gaps as applied to the information recording medium of FIG. 5A;

DESCRIPTION OF THE PREFERRED EMBODIMENTS

Figure 1:
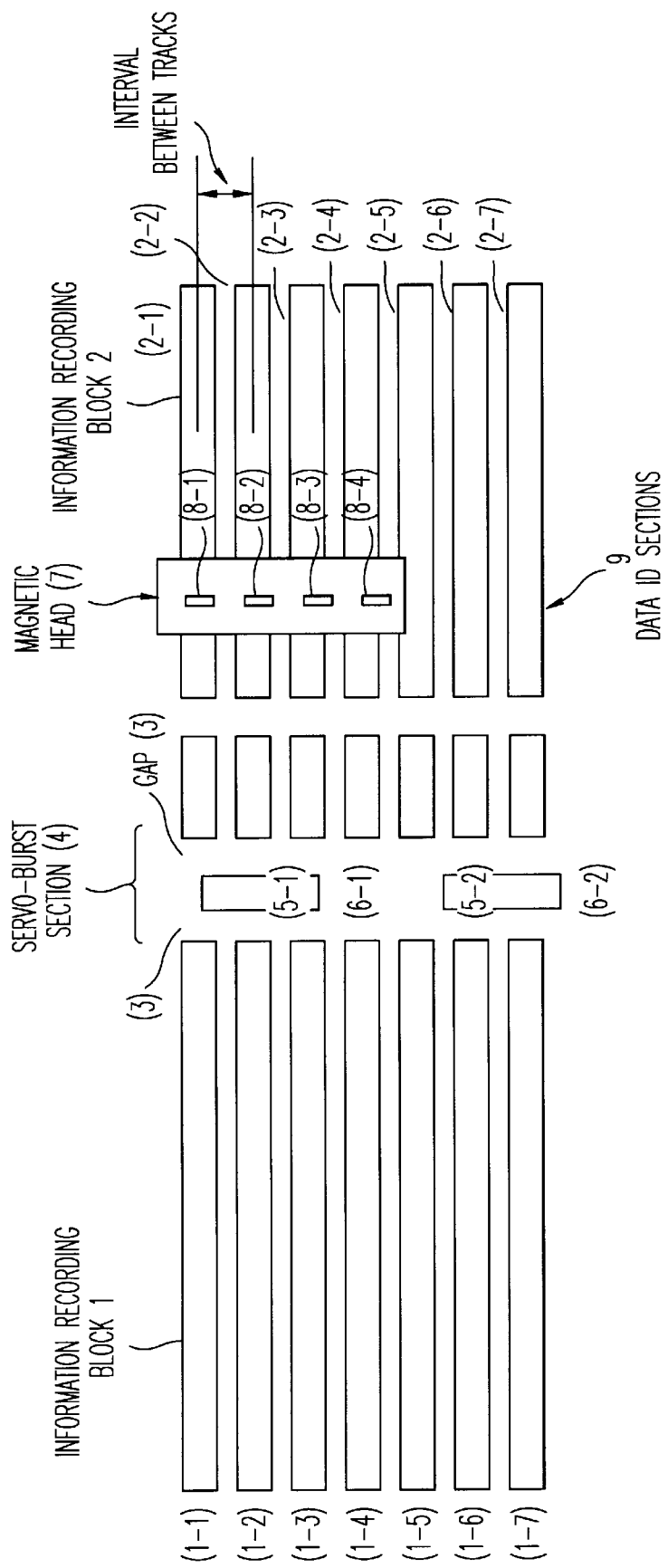
FIG. 1 is a schematic diagram of a first embodiment of an information recording medium according to the present invention.

Referring now to the drawings, wherein like reference numerals designate identical or corresponding parts throughout the several views, and more particularly to FIG. 1 thereof, there is illustrated an information recording medium.

First Embodiment

As a first embodiment, a recording/reproducing method and structure of the present invention will be described with reference to FIG. 1. In this embodiment, for the sake of illustrative convenience, seven information recording tracks are provided (as will be discussed) However, FIG. 1 shows only a portion of the tracks related to tracking control on a recording medium.

On a longitudinal recording medium, seven information recording tracks are provided, and divided by a servo-burst section 4 into information recording blocks 1 (tracks 1-1 to 1-7) and 2 (tracks 2-1 to 2-7 which correspond with tracks 1-1 to 1-7). Further, a gap section 3 is provided between the blocks 1 and 2 of the information recording tracks The gap section 3 includes the servo-burst section 4 and data ID sections 9. The data ID sections 9 are provided for the purpose of recording information such as distance from a data-recording start point and track number, as is needed.

The servo burst section 4 includes servo-burst-signal recording sections 5-1 and 5-2 having a length in a direction orthogonal to the running direction of the information recording medium and twice the length of the track pitch (interval between the centers of tracks); servo-burst-signal non-recording sections 6-1 and 6-2 have the same length of that of the servo-burst-signal recording sections. The servo-burst-signal recording sections 5-1, 5-2 and the servo-burst-signal non-recording sections 6-1, 6-2 are arranged alternatively In FIG. 1, the servo-burst-signal recording sections 5-1 and 5-2 and the servo-burst-signal non-recording sections 6-1 and 6-2 have the same length respective lengths, however, the length of the recording sections 5-1 and 5-2 and that of the non-recording sections 6-1 and 6-2 may be different.

Border lines between the servo-burst-signal recording sections 5-1, 5-2 and the servo-burst-signal non-recording sections 6-1, 6-2 are positioned respectively to, if extended, positions of data tracks in recording blocks 1 and 2. In FIG. 1, the border lines, if extended, would be centrally located in a data track of the recording blocks 1 and 2.

A magnetic head 7 is positioned opposite to the recording medium, however, FIG. 1 shows the magnetic head 7 at a position clearly indicating the correspondence between the tracks in blocks 1 and 2, and the magnetic head 7. The magnetic head 7 has four head gaps 8-1 to 8-4, arranged with an interval equivalent to that between the tracks in blocks 1 and 2. Consequently, the head 7 permits simultaneous reading and/or writing of signals in the tracks of the blocks 1 and 2.

By the above-described arrangement, a phase difference between reproduced signals from two pairs of defined gaps among four gaps 8-1 through 8-4, becomes 90°, thus high-precision tracking control, to be described later, can be attained.

The position of the magnetic head 7 is controlled as follows. Servo-burst reproduction signals are reproduced by the respective head gaps 8-1 to 8-4 and outputted from the servo-burst signal recording sections 4. Assuming that the intensities of signals outputted from the head gaps 8-1 to 8-4 are respectively represented as A to D, the differences (A–C) and (B–D) of the signals are outputted as difference signals having 90° different phases, with displacement of the head gaps in a direction orthogonal to a tape-running direction, similar to encoder output signals generally used for position control. The head position control is made by using these difference signals.

Next, the principle of the present invention will be described in detail with reference to FIG. 2 and FIGS. 3A to 3E.

Figure 2:
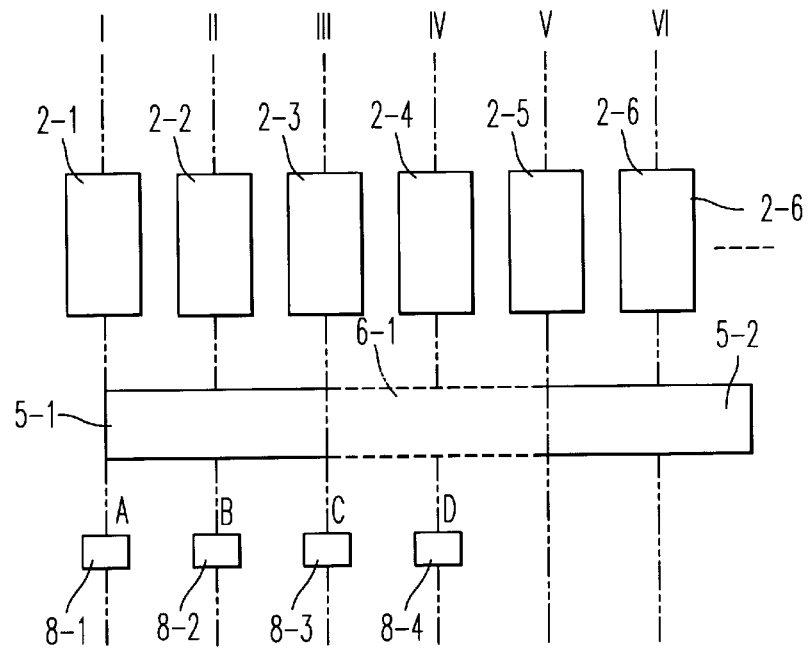
FIG. 2 is an enlarged schematic diagram showing a servo signal section with peripheral portions contained therein of the information recording medium shown in FIG. 1.

FIG. 2 is an enlarged schematic view showing the servo-burst signal section 4 and its peripheral portions in FIG. 1. In FIG. 2, the head gaps 8-1 to 8-4 of the magnetic head 7 are located at positions corresponding to the centers of the data tracks 2-1 to 2-4. Numerals I to VI denote center lines of the respective data tracks 2-1 to 2-6. In the particular positional arrangement as shown in FIG. 2, i.e., in the status where the head gaps 8-1 to 8-4 are located at the positions I to IV, the head gaps 8-1 and 8-3 perform reproduction on the servo-burst-signal recording section 5-1 respectively with ½ of the gap width, therefore, the reproduction output is ½ of that from the head gap 8-2. On the other hand, the entire gap width of the head gap 8-4 is located in the servo-burst-signal non-recording section 6-1, and thus, no reproduction output is obtained from the head gap 8-4 when disposed over non-recording section 6-1.

From this status (i.e., positional arrangement), it can be seen that if the alignment of the head gaps 8-1 to 8-4 with respect to the servo burst section 4 is improper and the head gap 8-1 moves towards the position II, the reproduction output from the head gap 8-1 becomes greater than ½ of that from the head gap 8-2. Then, at a point where the head gap 8-1 has moved forward the position II by the half of the gap width, the output of the head gap 8-1 reaches a maximum value.

With the movement of the head gap 8-1, the reproduction output from the head gap 8-3 decreases. When the reproduction output from the head gap 8-1 becomes the maximum, that from the head gap 8-3 becomes "0".

On the other hand, the reproduction outputs from the head gaps 8-2 and 8-4 do not change in this movement.

As the head gap 8-1 moves closer to the position II and the lower edge (right edge in FIG. 2) of the head gap 8-1 passes the position II, the lower edge of the head gap 8-2 passes the position III and the reproduction output from the head gap 8-2 begins to decrease. At this time, the lower edge of the head gap 8-4 passes the position V, which causes occurrence of the reproduction output from the head gap 8-4.

FIGS. 3A to 3D show the relation among the intensities of servo signals reproduced by the head gaps 8-1 to 8-4 and the head positions The head position control is performed based on the above relation. First, the servo-burst signal reproduction intensities A to D are measured, with a point where at least one of the four head gaps detects the rising edge of a servo-burst signal, as a start point. For example, FIG. 3A shows the signal produced by the head gap 8-1 if head gap 8-1 were to meander from the position I shown in FIG. 2 to other position II, III, etc, as shown in FIG. 2. Likewise, FIGS. 33 to 3D show the respective signals produced by head gaps 8-2 to 8-4 when the head gap 8-1 is positioned at respective positions between I to V.

Next, the difference (A–C) is obtained as a cosine signal X (X=A–C), and the difference (B–D), as a sine signal Y (Y=B–D), on the following conditions:

When Y>0 and |Y|>|X| hold, X is an error signal.
When X>0 and |X|>|Y| hold, Y is an error signal.
When Y<0 and |Y|>|X| hold, X is an error signal.
When X<0 and |X|>|Y| hold, Y is an error signal.
(|X|, |Y|: the absolute value of X and Y)

FIGS. 3E and 3F show the waveform charts of the signals X and Y, respectively.

Figure 4:
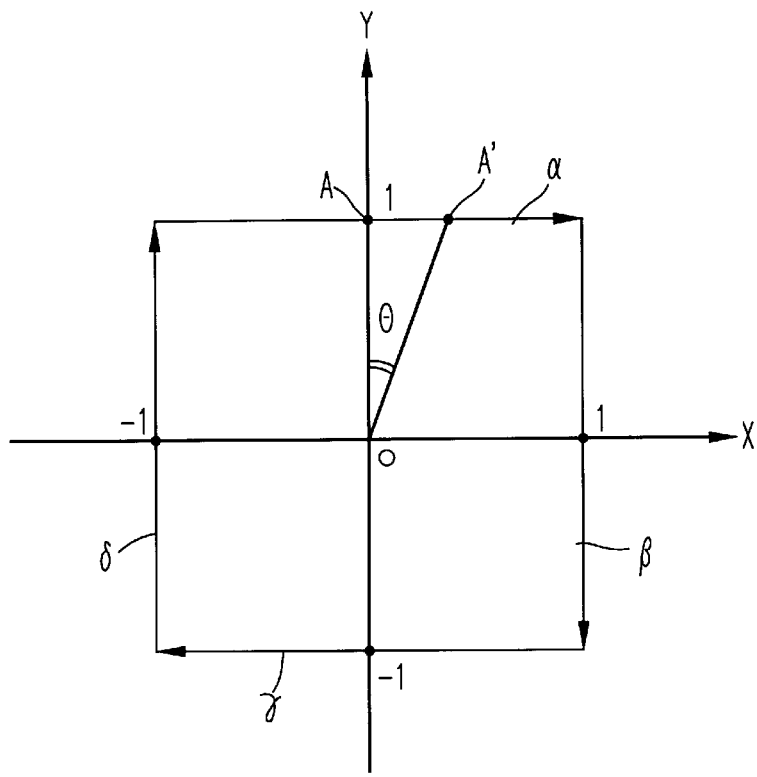
FIG. 4 is an exemplary graph of error signal detection and head position control.

The relation between the error signals is represented as a substantially square Lissagous figure having four sides $\alpha$, $\beta$, $\gamma$, and $\delta$ as shown in FIG. 4. In FIGS. 3E and 3F, the respective sections $\alpha$, $\beta$, $\gamma$, and $\delta$ correspond to the sides of the error-signal Lissagous figure The other sections correspond to the respective vertices of the Lissagous figure. The central positions of the information tracks of blocks 1 and 2 (FIG. 1), on which the respective head gaps (8-1 to 8-4) should be positioned, correspond to the intersections of respective sides with coordinate axes. Accordingly, the position of the head 7 is corrected so that the head gaps 8-1 to 8-4 are always on these intersections The signal intensities used here may be any other signal intensities, e.g., signal level between signal peaks, an average value of the absolute values, and integrated value of amplitudes, so far as the same measurement is made with respect to the head gaps.

More specifically, in the positional relationship (i.e., 'status) as shown in FIG. 2 and described above, assuming that the reproduction output from the head gap 8-2 is "1", the outputs from the head gaps 8-1 and 8-3 are "0.5" and the output from the head gap 8-4 is "0". Accordingly, the value of the signal X is "0" (X=A–C=0) and the value of the signal Y is "1" (Y=B–D=1). This corresponds to a position A in FIG. 4.

On the other hand, when the head is shifted downward, i.e., the head gap 8-1 has moved toward the position II, the outputs from the head gaps 8-2 and 8-4 do not change. However, the output from the head gap 8-1 is greater than "0.5", and the output from the 8-3 is less than "0.5". Accordingly, the signal X has a positive value.

This means that, in FIG. 4, a mark "·" representing the head position has moved from the point A to a point A'. The amount of the movement between the points A and A' corresponds to the error amount of the head-position. The error amount is obtained from the slope of a line extended from the origin to the head position on the Lissagous figure (the point A' in this case).

To obtain the error amount from the slope of the line, various methods are considered. For example, the error amount can be obtained as an angular value from:

When head position moves on side $\alpha$: $\tan^{-1}$ (X/Y);
When head position moves on side $\beta$: $\tan^{-1}$ (Y/X);
When head position moves on side $\gamma$: $\tan^{-1}$ (X/Y); and
When head position moves on side $\delta$: $\tan^{-1}$ (–Y/X).

In this method, when the head moves downward from a correct position (the position I to II in FIG. 2), a positive angle is obtained; on the other hand, when the head moves upward, a negative angle is obtained. Thus, the direction of the movement of the head and the amount of movement can be simultaneously obtained.

In this manner, in comparison with a head-position control by using only one difference signal, the head-position control by using a pair of difference signals can attain higher resolution. In the present embodiment, a certain level of control can be performed by using only the difference between the reproduction signals from the first and third head gaps 8-1 and 8-3, however, the difference between the reproduction signals varies due to factors other than actual tracking error. Accordingly, a high tracking precision cannot be attained. on the other hand, the head-position control by using two difference signals where the phase difference varies can detect a true error amount independently of signal variation due to factors other than tracking error. Thus, a high-precision tracking control can be performed.

In the present embodiment, for the purpose of simplification of explanation, the difference signal having 90° phase difference in normal status (i.e., like that shown in FIG. 1) is used, however, the principle of the present invention is applicable to any other error signals so far as the phase difference in normal status is constant. Further, in a case where a head having more than four gaps is employed, the head-position control can be performed by using adjacent gaps or an arbitrary two pairs of gaps, so far as the relation among the generated signals is satisfied.

Note that in the sections where |X|=|Y| holds (section positioned at the vertices of the Lissagous figure), basically the head-position control cannot be performed. However, in practice, such drastic positional shift corresponding to such sections does not occur, therefore there is no problem in practice.

Second Embodiment

Figure 5A:
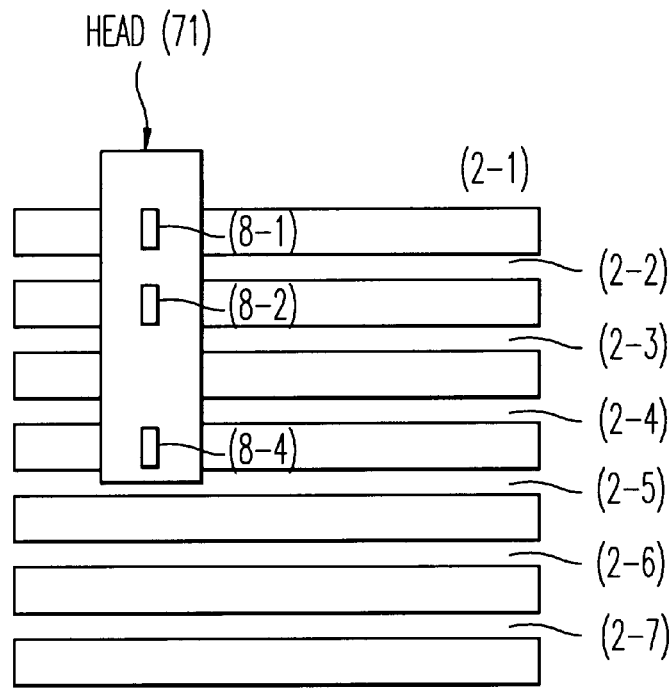
FIGS. 5A and 5B are schematic diagrams showing the constructions of an information recording medium according to a second embodiment according to the present invention.
Figure 5B:
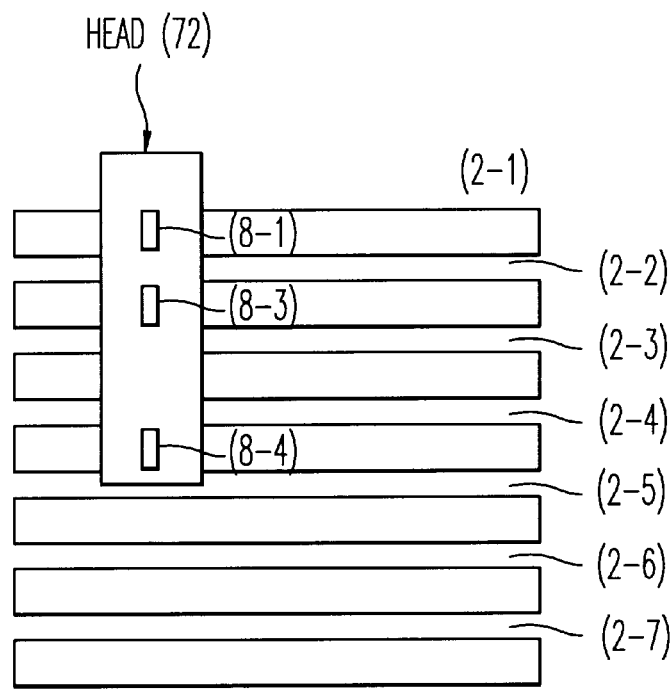
Figure 7:
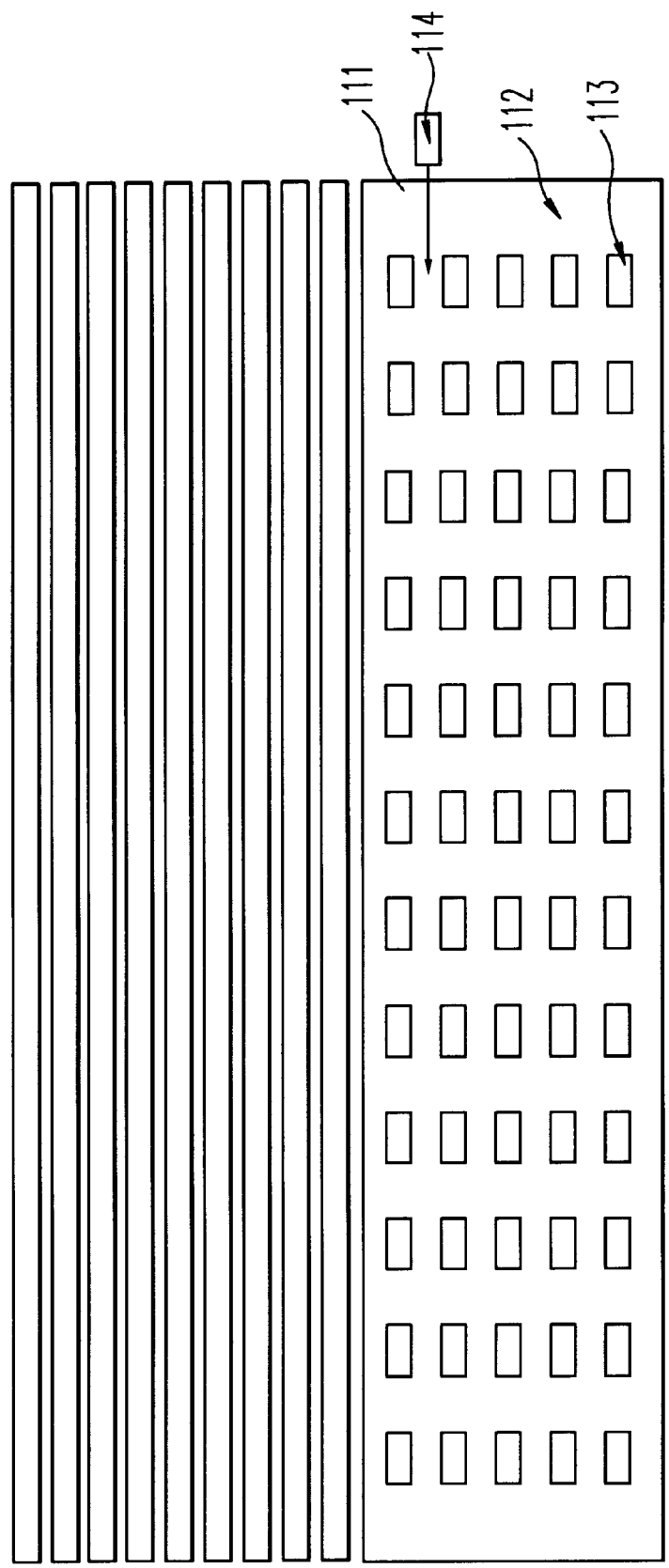
FIG. 7 is a first background art conventional recording medium.
Figure 8:
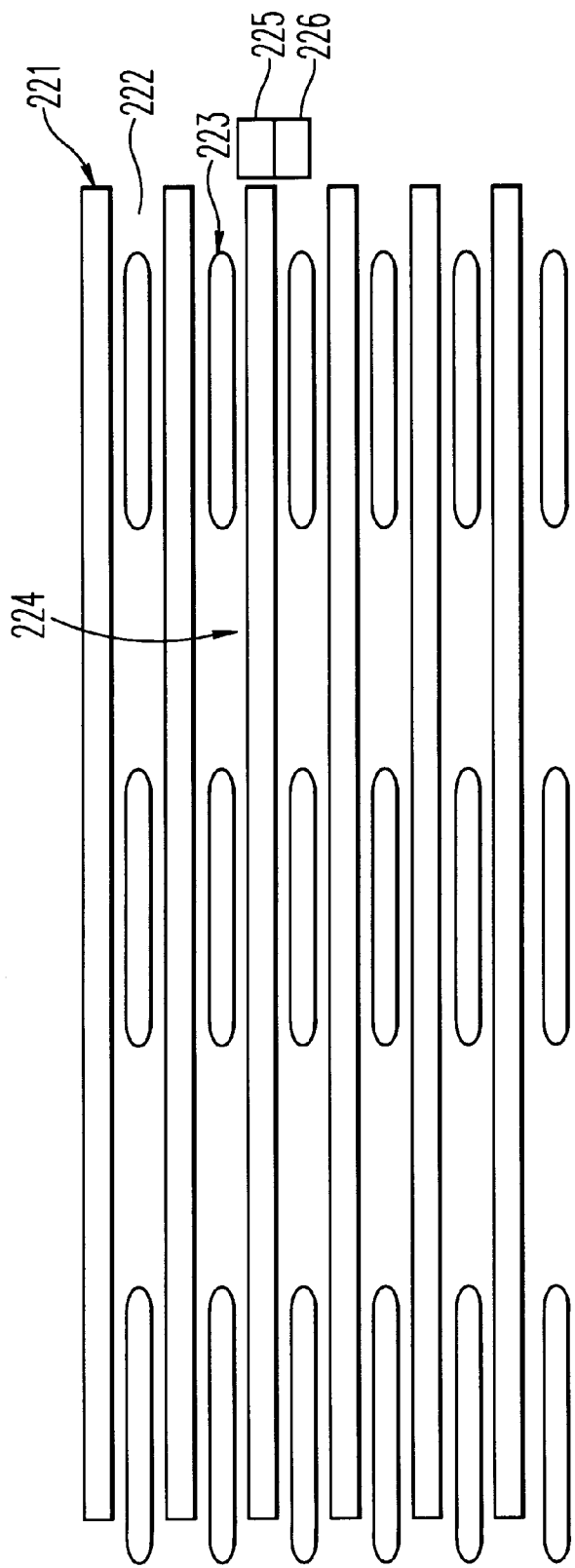
FIG. 8 is a second background art conventional recording medium.
Figure 9:
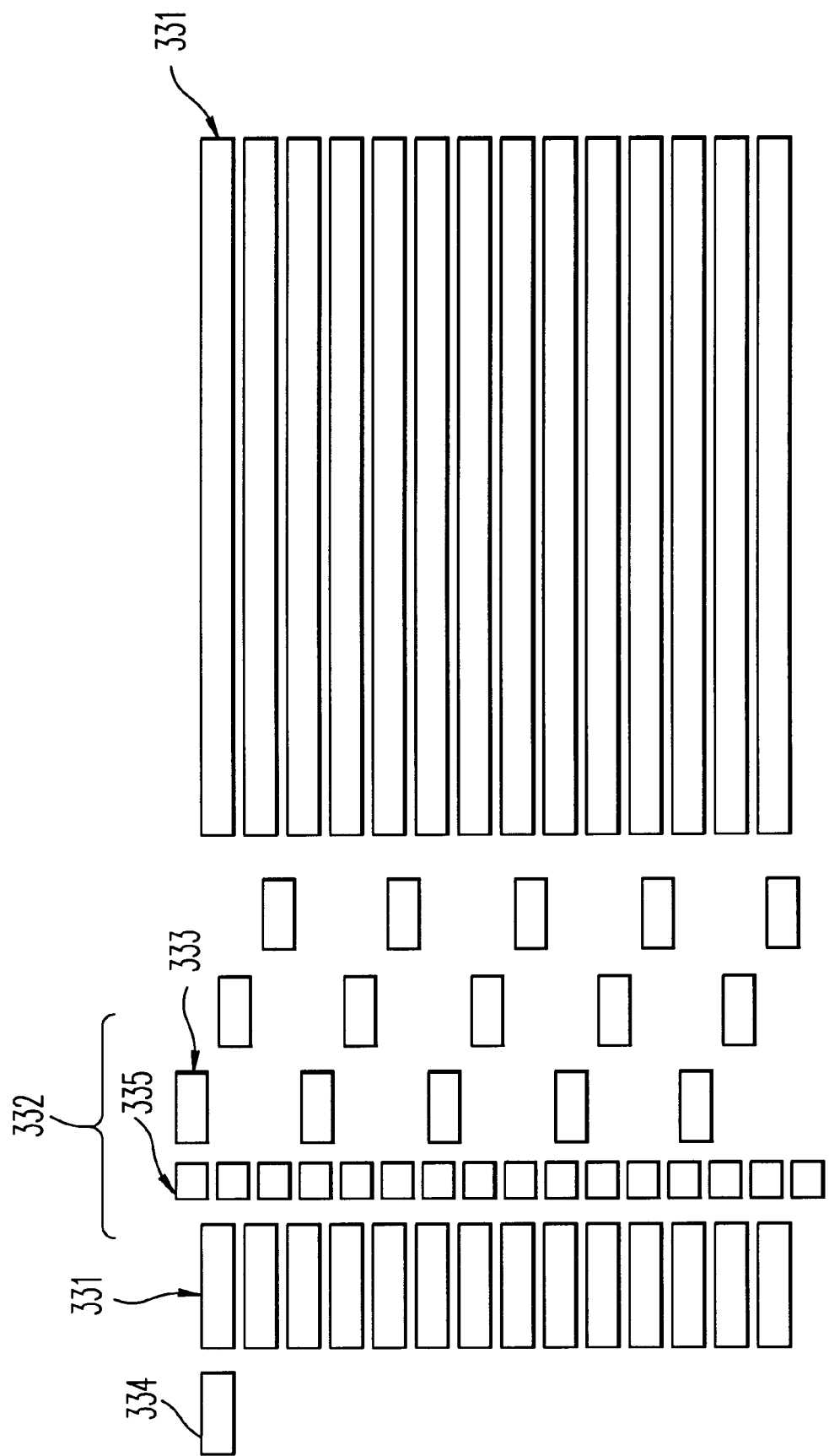
FIG. 9 is a third background art conventional recording medium.

FIGS. 5A and 5B show the constructions according to a second embodiment of the present invention. In the first embodiment, the four head gaps 8-1 to 8-4 are employed, and the output signals from the respective head gaps 8-1 to 8-4 are used to generate the X and Y signals; in the second embodiment, three head gaps 8-1, 8-2, and 8-4 are employed to generate similar signals.

That is, in FIG. 1 the sum of the intensity A of the output signal from the first head gap 8-1 and the intensity C of the output signal from the third head gap 8-3 is constant, and it is equal to the sum of the intensity B of the output signal from the second head gap 8-2 and the intensity D of the output signal from the fourth head gap 8-4, as represented by:

$$A+C=B+D \tag{1}$$

On the other hand, the signals X and Y are represented by:

$$X=A-C \tag{2}$$

$$Y=B-D \tag{3}$$

Then, as the intensity C is deleted from equations (1) and (2), $$X=2A-(B+D)$$

$$Y=B-D \tag{i}$$

As the intensity B is deleted from equations (1) and (3), $$X=A-C$$

$$Y=(A+C)-2D \tag{ii}$$

Thus, similar signals can be generated from the intensities of the output signals from the three head gaps.

Accordingly, the method (i) uses a head 71 having three head gaps (8-1, 8-2, and 8-4), as shown in FIG. 5A, and the method (ii), a head 72 also having three head gaps (8-1, 8-3, and 8-4), as shown in FIG. 5B. In the present embodiment, the interval between the head gaps 8-2 and 8-4 in FIG. 5A, and that between the head gaps 8-1 and 8-3 in FIG. 5B are respectively twice the interval between the tracks (2-1 to 2-7). This enables high-precision head-position control with a simpler constructions Note that it is also possible to perform a similar head-position control using the head having four head gaps (8-1 to 8-4) as shown in FIG. 1 In this case, three of the four head gaps are used.

FIGS. 6A to 6E are waveform charts showing the reproduction output signals, the signals X and Y, upon using the head having three head gaps in FIG. 5A, similar to FIGS. 3A to 3F.

Third Embodiment

In the above embodiments, three or more head gaps are employed, however, the recording/reproducing method of the present invention can be realized by using two head gaps. That is, the present invention requires two signals having different phases for head-position control That is, in a case where the signals in FIGS. 3A and 33 are obtained and if the value obtained from equation (1) ((A+C) or (B+D)) is always a constant value, the signals in FIGS. 3C and 3D can be obtained from the constant value and the signals in FIGS. 3A and 3B.

Note that in the other embodiments, as the head-position control is performed by always measuring the value obtained from equation (1) ((A+C) and/or (B+D)) and normalizing the reproduction output values from the respective head gaps with the measured value, it is possible to correct the variation such as contact pressure between the information recording medium and the magnetic head. In the present embodiment, the head-position control can be sufficiently effective only when such variation can be substantially ignored.

As described above, the present invention reduces the track pitch between information recording tracks on an information recording medium, increases the information recording density, and reduces the information recording area such as a servo-burst signal recording section. This increases the information recording density, and further, attains simple manufacture of information recording medium since recording of the servo signals is easily made, thus reducing cost.

Signal processing aspects of the present invention may be conveniently implemented using a conventional general purpose digital signal processing chip (or processor) programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

As many apparently widely different embodiments of the present invention can be made without departing from the spirit and scope thereof, it is to be understood that the invention is not limited to the specific embodiments thereof except as defined in the appended claims.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An information recording medium comprising:
   a plurality of information recording tracks having respective centers, arranged in parallel to a running direction of said information recording medium, and divided into a plurality of data blocks, said plurality of information recording tracks being configured for recording/reproducing information; and
   a servo-burst section disposed between said data blocks, said servo-burst section including,
      a servo-burst-signal recording section, and
      a servo-burst-signal non-recording section alternately disposed with said servo-burst-signal recording section, where said servo-burst-signal recording section having a length, in a direction approximately orthogonal to the running direction, being at least twice an interval between the centers of said information recording tracks.

2. The information recording medium according to claim 1 wherein said information recording medium comprises a longitudinal information recording medium.

3. The method of claim 1, wherein:
   the servo burst recording section being a contiguous section.

4. The medium of claim 1, wherein the servo burst recording section being aligned in the-direction approximately orthogonal to the running direction with a next closest servo burst recording section.

5. A method for servo positioning of head gaps in an information recording/reproducing operation, comprising the steps of:
   arranging a plurality of information recording tracks in a running direction of an information recording medium and having respective centers;
   dividing said information recording tracks into a plurality of data blocks; and
   disposing a servo-burst section between said data blocks, comprising a servo-burst-signal recording section alternately disposed with a servo-burst-signal non-recording section, a length of said servo-burst recording section being at least twice a distance between respective centers of adjacent information recording tracks;
   obtaining signals from said servo-burst section with a head having at least two head gaps;
   detecting positional deviations of the head gaps with respect to the centers of said information recording tracks based on intensity changes of said signals; and
   controlling the positions of said head gaps based on the positional deviations such that at least one of the head gaps is located at a position to reproduce one of the signals from both of said servo-burst-signal recording section and said servo-burst-signal non-recording section simultaneously, wherein a ratio of a first one of the signals from one of the head gaps located to correspond with the servo-burst-signal recording section and from a second one of the signals from another one of the head gaps located to correspond with the servo-burst-signal non-recording section is a predetermined ratio.

6. A method for servo positioning of head gaps in an information recording/reproducing operation, comprising the steps of:
   arranging a plurality of information recording tracks in a running direction of an information recording medium and having respective centers;
   dividing said information recording tracks into a plurality of data blocks; and
   disposing a servo-burst section between said data blocks, comprising a servo-burst-signal recording section alternately disposed with a servo-burst-signal non-recording section, a length of said servo-burst recording section being at least twice a distance between respective centers of adjacent information recording tracks;
   generating at least two signals having phases 90° from each other respectively output from a head having at least two head gaps;
   detecting positional deviations of the at least two head gaps from the centers of said information recording tracks by using the two signals; and
   controlling the positions of said head gaps based on the positional deviations.

7. The method according to claim 6, wherein:
   said disposing step comprises disposing said servo-burst-signal recording section with a length twice that of an interval between said information recording tracks;
   said generating step comprises
      generating said at least two signals with first to fourth information recording/reproducing head gaps provided at a same interval as the interval between said information recording tracks, and
      generating the at least two signals based on intensities A to D of signals from the first to fourth head gaps respectively, from any of sets of differences
      (A−C) and (B−D),
      (A−C) and (A+C)−2D, or
      (2A−(B+D)) and (B−D).

8. The method of claim 7, wherein:
   said controlling step comprises determining an error amount from a slope of line in a square Lissagous figure, said slope being $\tan^{-1}((A-C)/(B-D))$.

9. The method according to claim 6, wherein:
   said disposing step comprises disposing said servo-burst-signal recording section with a length twice that of an interval between said information recording tracks; and
   said generating step comprises
      generating said at least two signals with first and second information recording/reproducing head gaps provided at a same interval as the interval between said information recording tracks, and a third information recording/reproducing head gap provided at an interval being twice that of the interval between said information recording tracks, and
      generating the at least two signals based on intensities of signals from the first head gap, the second head gap and the third head gap from differences 2A−(B+D) and B−D.

10. The method according to claim 6, wherein:
    said disposing step comprises disposing said servo-burst-signal recording section with a length twice that of an interval between said information recording tracks; and
    said generating step comprises
       generating said at least two signals with first and second information recording/reproducing head gaps provided at a same interval as the interval between said information recording tracks, and a third information recording/reproducing head gap provided at an interval being twice that of the interval between said information recording tracks, and generating the at least two signals based on intensities A, C and D of reproduction signals from the first head gap, the second head gap, and the third head gap from differences A−C and (A+C)−2D.

11. The method according to claim 6, wherein:

said disposing step comprises disposing said servo-burst-signal recording section having a length twice that of an interval between centers of adjacent ones of said information recording tracks;

said generating step comprises generating said at least two signals with first, second and third information recording/reproducing head gaps, said first and said second head gaps being separated by a distance that is common with the interval between said information recording tracks, said second and third head gaps being provided at twice the distance of the first and second head gaps, and the first and third head gaps being place at three times the distance of the first and second head gaps, and generating the at least two signals based on intensities A, B and D of signals from the first head gap, the second head gap and the third head gap from differences (2A−(B+D)) and (B−D).

12. The method according to claim 6, wherein:

said disposing step comprises disposing said servo-burst-signal recording section having a length twice that of an interval between centers of adjacent ones of said information recording tracks;

said generating step comprises generating said at least two signals with first, second and third information recording/reproducing head gaps, said first and said second head gaps being provided at twice the interval between said information recording tracks, said second and third head gaps being provided at the same interval as between said information recording tracks, and the first and third head gaps being place at three times the interval between said information recording tracks, and generating the at least two signals based on intensities A, C and D of reproduction signals from the first head gap, the second head gap, and the third head gap respectively from differences (A−C) and (A+C)−2D.

13. The method according to claim 6, wherein:

said disposing step comprises disposing said servo-burst-signal recording section with a length twice that of an interval between said information recording tracks;

said generating step comprises generating said at least two signals with first to fourth information recording/reproducing head gaps provided at a same interval as the interval between said information recording tracks, and generating the at least two signals based on relative intensities A to D of signals from the first to fourth head gaps respectively.

14. The method of claim 13, wherein:

said generating step comprises generating said at least two signals from respective outputs of any three of the first to fourth information recording/reproducing head gaps provided at a same interval as the interval between-said information recording tracks, based on a relationship (A+C=B+D), where A, B, C and D correspond to respective outputs of the first to fourth head gaps respectively.

15. An apparatus for servo positioning of head gaps in an information recording/reproducing operation, comprising:

means for arranging a plurality of information recording tracks in a running direction of an information recording medium and having respective centers;

means for dividing said information recording tracks into a plurality of data blocks;

means for disposing a servo-burst section between said data blocks, and for alternately disposing a servo-burst-signal recording section with a servo-burst-signal non-recording section;

means for generating at least two signals, having phases 90° from each other respectively output from a head having at least two head gaps;

means for detecting positional deviations of the at least two head gaps from the centers of said information recording tracks by using the two signals; and means for controlling the positions of said head gaps based on the positional deviations.

16. An information recording device comprising:

a head having a plurality of head gaps spaced apart from one another; and an information recording medium having, a plurality of information recording tracks having respective centers aligned with said plurality of head gaps, arranged in parallel to a running direction of said information recording medium, and divided into a plurality of data blocks, said plurality of information recording tracks being configured for recording/reproducing information, and a servo-burst section disposed between said data blocks, said servo-burst section including, a servo-burst-signal recording section, and a servo-burst-signal non-recording section alternately disposed with said servo-burst-signal recording section, wherein at least one of said servo-burst-signal recording section and said servo-burst-signal non-recording section have a length, in a direction approximately orthogonal to the running direction, being at least twice an interval between centers of adjacent of two of said information recording tracks.

* * * * *

UNITED STATES PATENT AND TRADEMARK OFFICE
CERTIFICATE OF CORRECTION

PATENT NO. : 5,943,180

DATED : August 24, 1999

INVENTOR(S): Yuzo SEO, et al.

It is certified that an error appears in the above-identified patent and that said Letters Patent is hereby corrected as shown below:

On the title page, item [73] the assignee's name should be:

--Mitsubishi Chemical Corporation--

Signed and Sealed this

Twenty-third Day of May, 2000

Attest:

Q. TODD DICKINSON

*Attesting Officer*      *Director of Patents and Trademarks*